United States Patent Office 2,752,351
Patented June 26, 1956

2,752,351

CRYSTALLINE RESERPINE, SALTS AND COMPOSITIONS THEREOF

Emil Schlittler, Madison, N. J., and Johannes Mueller, Arlesheim, Switzerland

No Drawing. Application July 10, 1953, Serial No. 367,357

8 Claims. (Cl. 260—286)

The present invention relates to the preparation of a new compound in pure form having sedative-hypnotic and hypotensive action, which is hereinafter called reserpine.

According to the present invention this compound is prepared from plants of the Rauwolfia species, more particularly, *Rauwolfia serpentina* Benth. It can also be obtained from *Rauwolfia vomitoria* Afz. or *Rauwolfia inebrians*. The compound is preferably prepared from the roots of these plants.

Various alkaloids have already been isolated from *Rauwolfia serpentina* Benth., such as ajmaline, ajmalinine, ajmalicine, serpentine, serpentinine, isoajmaline, neo-ajmaline and rauwolfinine. Heterogeneous preparations with a sedative and hypotensive effect obtained from the root material of plants of the Rauwolfia species are already described in the literature, and used as medicaments. See Dutt et al., the Indian Journal of Pharmacology, vol. 9, pages 54–57 (1947). It is stated therein that both ajmaline and serpentine produce a fall of blood pressure whereas serpentinine causes a rise. It is also stated that none of the alkaloids possessed any marked sedative action, whereas the alcoholic extracts possessed sedative or hypnotic properties. Dutt et al., disclose the preparation of a so-called "oleoresin" fraction. The authors state that the oil-free resin was found to produce sedative and hypnotic effects but that it does not cause a fall of blood pressure.

According to the present invention it has unexpectedly been found that a sedative-hypnotic and hypotensive compound in pure form can be obtained from plants of the Rauwolfia species. In so far as known, no one heretofore has prepared a pure active compound with these properties. According to the present invention, a sedative-hypnotic and hypotensive substance in pure form can be obtained when the alkaloid melting at about 263° C. (with decomposition) and having the approximate optical rotation $[\alpha]_D^{23} = -118°$ (in absolute chloroform) is isolated from an extract having a sedative effect and obtainable from a plant of the Rauwolfia species with the use of a weakly polar or non-polar solvent only partially miscible with water. The alkaloid can be recrystallized from acetone, from a mixture of chloroform and ether or preferably from methanol. It is insoluble in water and petrol ether, fairly soluble in benzene, ether, cold alcohol and cold acetone, and readily soluble for instance in chloroform, ethyl acetate, acetic acid of 10 per cent. strength and phosphoric acid. Analysis shows the following results: C=65.07; 65.04; H=6.62; 6.65; N=4.64; 4.49%. Its empirical formula appears to be $$C_{33}H_{40}O_9N_2$$

Its ultra-violet spectrum in ethanol has a flat maximum at 215 m$\mu$ (log $\epsilon$ approx. 4.8) a pronounced maximum at 269 m$\mu$ (log $\epsilon$ approx. 4.2) and an adjoining shoulder at 295 m$\mu$ (log $\epsilon$ approx. 4.0). There is a minimum at 246 m$\mu$ (log $\epsilon$ approx. 4.0). The shorter wave part of the infrared spectrum is distinguished by the following strong bands: 2.92 $\mu$; 5.76 $\mu$; 5.83 $\mu$; 6.13 $\mu$; 6.28 $\mu$; 6.67 $\mu$ (in Nujol).

The new alkaloid is a weak base and forms salts, for instance a difficultly soluble hydrochloride melting at about 221° C. (with decomposition), a nitrate melting at about 235° C. and a picrate melting at about 186° C. It dissolves in an excess of dilute acetic acid thus forming the acetate.

The pharmacological effect of reserpine is complex and primarily marked by a strong and prolonged sedative-hypnotic and hypotensive effect. Small doses are sufficient to induce in animals, for several hours, a quiet sleep from which they can be awakened again temporarily. Reserpine further stimulates peristalsis.

The Rauwolfia alkaloids hitherto isolated and known, for instance, ajmaline, serpentine and serpentinine, show no sedative-hypnotic and hypotensive effect.

In contrast to the heterogeneous preparations from plants of the Rauwolfia series used up to the present, the present invention provides the great advantage that with reserpine the exact weight of the dose to produce a certain effect can be indicated. In addition, preparations from the new alkaloid have a uniform effect, whereas, for instance, it is known that Rauwolfia plants contain substances with a hypertensive effect, for example, serpentine.

According to the present invention, it is possible to isolate reserpine in various ways. In general, it is advantageous to disintegrate the extract to be used according to the process with an adsorption agent, preferably by chromatography with one of medium strength, such as moderately active aluminum oxide, silicic acid, "Hyflo" (diatomaceous earth) or another silicate. The reserpine is eluted with benzene, mixtures of petroleum ether and benzene, or of benzene and acetone. In the presence of a little acetone or methanol it crystallizes spontaneously. Purification can be carried out, for example, by recrystallization from hot acetone, ethanol or a mixture of chloroform and ether or preferably from methanol. It is possible however to obtain reserpine in pure form by crystallizing the mentioned extracts directly from solvents such as alcohols or ketones, for example ethanol or acetone, more especially methanol.

According to the process there are used as starting materials more especially extracts from the root material of *Rauwolfia serpentina* Benth., *Rauwolfia vomitoria* Afz., or *Rauwolfia inebrians*. As a weakly polar or non-polar solvent which is only partially miscible with water, there is used for obtaining said extracts preferably a halogenated hydrocarbon, such as chloroform, ethylene chloride, or methylene chloride or trichloro-ethylene, benzene or ethyl acetate or mixtures thereof. Particularly useful extracts are obtained when the following original methods are used.

One method is characterized by treating the plant material of the Rauwolfia species or an extract with a sedative effect obtained therefrom, preferably a resin fraction treated in known manner with a lipoid solvent, such as petroleum ether, and alcohol, with a mixture of a polar solvent and a weakly polar or non-polar solvent only partially miscible with water, in the presence of water which may be added.

There may be added to the water bases, acids, or salts, such as ammonia, inorganic or organic acids, such as hydrochloric acid, phosphoric acid or acetic acid, sodium carbonate, sodium bicarbonate, potassium biphosphate or potassium bisulfate. Polar solvents are for instance alcohols, such as methanol, ethanol or higher aliphatic alcohols. It is of advantage to proceed by extracting with the mentioned mixture and separating the solution obtained into two phases by adding water. It is however possible to distribute the starting material between a mixture of water and a polar solvent and a weakly polar to non-polar solvent which is only partially miscible therewith. The distribution should preferably take place over several separation stages. The fractions with the weakly polar or non-polar solvents thus obtained can be evaporated to dryness and the residue worked up directly to reserpine according to the process or subjected to the above operation once more.

As starting material there is used in this method and the following ones, for instance the finely ground plant material of Rauwolfia species, more especially the root material of *Rauwolfia serpentina* Benth.; also of *Rauwolfia vomitoria* or *Rauwolfia inebrians* or one of their crude alcohol extracts such as the methanol extracts evaporated to dryness, which is preferably kneaded with water and then separated again from the water or one of their crude alcohol extracts partially evaporated which may contain a lipoid solvent such as ether, petroleum ether or hexane. The so-called resin fractions can be obtained for instance in the following way:

A crude alcohol extract of the finely ground plant material of Rauwolfia species is evaporated to dryness and then preferably kneaded first with water; the insoluble residue thus obtained is then treated with 2N-hydrochloric acid, dried and extracted continuously with a lipoid solvent, such as petroleum ether, the brown residue thereby produced is then treated with 95% ethanol and the brown solution obtained after filtration with suction evaporated to dryness.

Another original method of obtaining the extract to be used according to the process comprises treating plant material of the Rauwolfia species or an extract with sedative effect obtained therefrom with an aqueous acid agent thus forming a solution with a sedative effect, and extracting it with a weakly polar or non-polar solvent which is only partially miscible with water.

According to this method the starting material is extracted with an aqueous acid agent, more especially with an aqueous solution of a lower fatty acid, for example formic acid, acetic acid, propionic acid, or a phosphoric acid or an acid salt of a polybasic acid. The acid solution with sedative effect thus obtained can, for the purpose of further working up, either be concentrated to a smaller volume or diluted with water, or left unchanged. The extract is thereupon extracted several times with a weakly polar or non-polar solvent which is only partially miscible in water, preferably with a halogenated hydrocarbon, such as chloroform, ethylene chloride, methylene chloride or trichloro-ethylene, further with benzene or ethyl acetate. The extract with the weakly polar or non-polar solvent thus obtained can be washed neutral and evaporated to dryness. From the residue reserpine can be isolated according to the invention.

For the preparation of a useful extract it is possible to work in such a way that at any step in the process, for instance according to the methods described above, an extract free from solvent, for example, an extract obtained with methanol from roots, is mixed with a carrier substance such as "Hyflo," "Charcel DIC" (diatomaceous earths) or another silicate, or the reserpine is adsorbed from a solution, for example from an acid extract obtained according to the above method, such as acetic acid extract, by a carrier substance, preferably after formation of its difficultly soluble salts, for instance reserpine hydrochloride or reserpine nitrate, and the remaining steps in the process are carried out. The active substance can, for instance, be extracted from the carrier substance with one of the mentioned aqueous acid agents or by means of a mixture of a polar solvent and a weakly polar or non-polar solvent.

Depending on the method of working, reserpine is obtained in the form of the base or its salts. From the base therapeutically useful salts can be obtained, such as that of the hydrochloric acids, sulfuric acids, nitric acid, perchloric acid, phosphoric acids, acetic acid, propionic acid, lactic acid, oxalic acid, succinic acid, malic acid, tartaric acid, citric acid, ascorbic acid, methane sulfonic acid, ethane sulfonic acid, oxyethane sulfonic acid, benzoic acid, salicylic acid, p-aminosalicylic acid or toluene sulfonic acid, by reacting the reserpine with such acids in the presence or absence of a diluent. The salts can also be obtained by double decomposition. Thus, for example, from a solution of the reserpine acetate it is possible to precipitate its more difficultly soluble salts, as e. g. those of hydrohalic acids, by an addition of the corresponding acid.

The following examples illustrate the invention, the relation between parts by weight and parts by volume being the same as that between the gram and the cubic centimeter:

*Example 1*

200 parts by weight of preliminarily purified "oleoresin" (see below), are subjected to a counter current distribution between a mixture of 50 per cent methanol and 50 per cent water as the upper phase in equilibrium with chloroform as the lower phase. It is found that a separation which is sufficient for practical purposes is achieved when 200 parts by weight of the oleoresin are distributed in 6 separating funnels between 2,000 parts by volume of upper and 2,000 parts by volume of lower phase in each case. The twelve phases (Ph) resulting from the distribution in the 6 separating funnels (SF I to VI) can be associated in the following manner with the formation of 6 fractions which possess the properties set forth:

| No. of Fraction | Quantity of Substance in parts by weight | Color | Sedative Effect |
| --- | --- | --- | --- |
| 1. (Upper Ph, SF I) | 75–80 | Black-brown | Very small. |
| 2. (upper Ph, SF II and III) | 45–50 | brown | small. |
| 3. (lower Ph, SF I, II and III) | 10 | light-brown | Do. |
| 4. (upper and lower Ph, SF IV) | 15–20 | ----do---- | Do. |
| 5. (upper Ph, SF V and VI) | 15 | ----do---- | Do. |
| 6. (lower Ph, SF V and VI) | 35–40 | green-brown | strong. |
| Total | 200 | | |

Fraction 6, which is found to be active, is further purified by chromatography over alumina. There is used with advantage for this purpose neutral aluminum oxide of the activity stages II—III (according to Brockmann). 34 parts by weight of fraction 6 are dissolved in 400 parts by volume of benzene, treated with 100 parts by volume of petroleum ether, whereby a portion of the substance is precipitated in flocks, and passed through a column of 800 parts by weight of alumina. The column is then washed through with a mixture of petroleum ether and benzene in the proportion by volume 1:4, if desired under pressure, as a result of which first an inactive light yellow oil, then about 0.6 part by weight of an inactive crystal fraction of melting point 238–239° C. and finally the substance of sedative effect, frequently accompanied by a red dyestuff, are eluted. The first solvent mixture is now replaced consecutively by benzene and by a mixture of benzene and acetone in the proportion by volume 2:1, whereby the final residues of the active material are removed from the column. After evaporation, the eluate fractions are treated with a little acetone and in most cases crystallize within a short time. The crystallized substance can be easily isolated by filtration with suction and washing with a mixture of equal parts by volume of acetone and ether and with acetone. 4.5–5 parts by weight are obtained of a crude crystallizate of melting point about 250° C. The further purification takes place by recrystallization from hot acetone or from a mixture of chloroform and ether, whereby the almost colorless reserpine of melting point 262–263° C. (with decomposition) and $[\alpha]_D^{23} = -118°$ (chloroform) is obtained.

The recovery of the crystallized reserpine from fraction 6 can also take place by a further countercurrent distribution. Thus, for example, 29.7 parts by weight of the residue obtained from fraction 6 can be distributed in countercurrent in 8 separating funnels, in each case between 500 parts by volume of a mixture of 60 per cent benzene and 40 per cent hexane as the upper phase in equilibrium with 500 parts by volume of a mixture of 80 per cent ethanol and 20 per cent water as the lower phase. From the fraction obtained by combination of the upper phases of the separating funnels Nos. 2, 3 and 4 crystalline reserpine can be isolated in an analogous manner to that described above.

The starting material can be produced in the following manner:

4,000 parts by weight of finely ground root bark of *Rauwolfia serpentina* Benth. are subjected to percolation with about 20,000 parts by volume of methanol or ethanol until Mayer's reagent for alkaloids only gives a very weak positive reaction. The alcohol extract is then evaporated to dryness under reduced pressure and the residue, amounting to 500–600 parts by weight, masticated several times with water for the removal of the soluble constituents. For removal of the residual basic constituents, the insoluble residue is subsequently masticated several times with dilute hydrochloric acid, washed with water and dried. The remaining insoluble portion, which is called oleoresin, is thereupon, for preliminary purification, finely ground and exhaustively extracted with petroleum ether and the brown powder remaining after this operation stirred for several hours with about 2,000 parts by volume of 95 per cent ethanol. By this means 80–90 per cent of the material passes into solution. After filtration with suction, the dark brown solution is evaporated to dryness and about 200 parts by weight are obtained of preliminarily purified oleoresin.

Example 2

1,000 parts by weight of ground roots of *Rauwolfia serpentina* Benth. are extracted three times while stirring with 3,000 parts by volume of a mixture of 2,100 parts by volume of chloroform and 900 parts by volume of methanol and heating to 60° C. the third time, and the extract solution is freed from the root material each time by filtering with suction and washing the residue with 500 parts by volume of the above mixture.

The extract solutions are worked up separately or combined. For that purpose 600 parts by volume of water and a sufficient quantity of a saturated solution of sodium bicarbonate to produce a pH value of 8.5 to 9 are added to 1,000 parts by volume of the extract solution, and the whole is well agitated. The two phases are separated in a separating funnel. The combined lower phases (chloroform) are washed once more with 300 to 400 parts by volume of a sodium chloride solution of 2–3% strength. The combined upper phases (water/methanol) are again extracted with 200 parts by volume of chloroform, whereupon the second chloroform phase is also passed through the aforementioned sodium chloride solution of 2–3 per cent strength. The combined chloroform extracts are dried with sodium sulfate and evaporated to dryness in vacuo.

25–30 parts by weight of chloroform residue are dissolved in the warm in 100 parts by volume of dry methanol, allowed to stand for some time, filtered with suction from the resulting crystallizate and the crystal cake washed with a little methanol. The combined methanol filtrates are concentrated to a volume of 50 to 60 parts by volume and any greasiness occurring dissolved again by lightly warming and then allowed to stand for several days to crystallize.

The whole is then filtered with suction from the crystallizate and washed again with methanol. The crystallizate is extracted repeatedly with 10–20 parts by volume of 2-N-acetic acid to effect purification. After bringing the combined, clear extract solutions to a temperature of about 5° C. by ice-cooling, the hydrochloride is precipitated by slowly adding a tenth of its volume of concentrated hydrochloric acid dropwise while stirring briskly. The whole is then stirred for a further 30–40 minutes, filtered with suction, washed with water, and well freed from liquid by suction.

The residue is suspended with 15 parts by volume of acetone, filtered with suction, washed with a little acetone and then with ether and dried on the funnel, thus obtaining the almost colorless hydrochloride of reserpine in a very fine form.

In order to free the base, the hydrochloride is dissolved in a minimum quantity of a mixture of 7 parts by volume of chloroform and 3 parts by volume of methanol. To this solution there are added 6 parts by volume of water, and sufficient bicarbonate solution to bring the pH value to about 9. The mixture is agitated, the phases separated, washed in the way described above, dried and evaporated. The amorphous evaporated residue is dissolved in once to twice the quantity of methanol by warming, whereupon the reserpine crystallizes almost immediately. After standing for several hours the pure base is isolated by filtration with suction.

Example 3

7,000 parts by weight of powdered bark from the root of *Rauwolfia serpentina* Benth, are percolated with about 35,000 parts by volume of methanol. After evaporating the methanol extract, 1,050 parts by weight are obtained of a dark colored powder which is treated several times with water for removal of soluble constituents. The insoluble residue remaining from this operation is subsequently masticated five times, in each case with 1,500 parts by volume of 10 per cent aqueous acetic acid, the solution being best separated from the smeary residue by centrifuging. The brown acetic acid solution, which for further working up can be concentrated at low temperature to a small volume or be diluted with half the volume of water, possesses a pH of about 3.9. This solution is extracted by shaking with 3,500–4,000 parts by volume of chloroform divided into 3–4 portions. These chloroform extracts are washed once with potassium carbonate solution and twice with water, dried with sodium sulfate and evaporated to dryness under reduced pressure. The residue, amounting to 70–80 parts by weight, forms a green brown colored powder. For further purification, this residue is dissolved in benzene and chromatographed over 1,000–1,200 parts by weight of neutral aluminum oxide (activity II—III according to Brockmann). On elution with benzene there are first obtained small quantities of a yellow oil and 0.9 part by weight of an inactive crystallizate of melting point 238–239° C., after which the substance of sedative activity follows. As soon as the major quantity of the active substance has been eluted, further elution is carried out with a mixture of 2 parts by volume of benzene and 1 part by volume of acetone. In this manner the residue of the sedative substance is obtained and after that a further inactive crystallizate of melting point 141–143° C. The eluate fractions containing the sedative substance are evaporated to dryness. By recrystallization of the residue from hot acetone or a mixture of chloroform and ether, 6.5–7 parts by weight of reserpine are obtained in the form of almost colorless crystals of melting point 262–263° C. (with decomposition); $[\alpha]_D^{23} = -118°$ (in chloroform).

In the above example the 10 per cent acetic acid can be replaced, for example, by 2 per cent phosphoric acid.

Example 4

7,000 parts by weight of powdered bark from the root of *Rauwolfia serpentina* Benth. are percolated with methanol as described in Example 1, evaporated, and the residue kneaded with water. The insoluble residue which is thus obtained is kneaded three times with 1,100 parts by volume of 15% aqueous acetic acid each time and the solution separated from the greasy residue by centrifuging or filtration. The combined acetic acid extracts are then diluted with half their volume of water and extracted with a total of 3,000–3,500 parts by volume of chloroform, in 3–4 portions. The chloroform extracts are further treated as indicated in Example 1. 7–7.5 parts by weight of crystalline reserpine are obtained therefrom.

*Example 5*

2,000 parts by weight of powdered bark from the root of *Rauwolfia serpentina* Benth. are suspended in 12,000 parts by volume of 15% acetic acid and stirred vigorously for 15 hours: The acid extract solution is then separated from the residue, advantageously by means of a basket centrifuge. In this manner about 8,000 parts by volume of a dark brown solution are obtained (Extract A). The extraction is repeated twice in the same manner, using 9,000 parts by volume of 15% aqueous acetic acid each time, which yield 8,000–9,000 parts by volume of extract solution (Extracts B and C). Each of the three extract solutions of 8,000 parts by volume is diluted with 4,000 parts by volume of water and advantageously separately extracted by shaking with about 8,000 parts by volume of chloroform, divided into 3–4 fractions. The quantity of chloroform required for the extraction can be reduced considerably if, e. g. the second chloroform extract of Extract A is used also for the first extraction of Extract B, or the third chloroform extract of Extract A is used for the second extraction of Extract B and then in the first extraction of Extract C. The chloroform extracts are washed with potassium carbonate or sodium carbonate solution and water, dried with sodium sulfate and evaporated to dryness in vacuo. For further purification, the residue which amounts to 45–50 parts by weight is chromatographed over 700–800 parts by weight of alumina as described in Example 1. 2.5 parts by weight of crystalline reserpine are thus obtained.

*Example 6*

1,000 parts by weight of ground roots from *Rauwolfia serpentina* Benth. are moistened with 1,000 parts by volume of methanol, and then extracted three to four times with 2,000 parts by volume of methanol each time while stirring for 10 to 16 hours and filtering with suction each time. It is advantageous to heat to about 65° C. beginning with the second extraction.

100 parts by weight of the evaporated methanol extract are mixed with 70 parts by weight of "Hyflo," and moistened with 100 parts by volume of acetic acid of 15 per cent strength. The mixture is then extracted three to four times with 150 parts by volume of acetic acid of 15 per cent strength each time, the mixture being triturated and filtered with suction each time, and the residue is washed with 100 parts by volume of acetic acid of 15 per cent strength.

The combined acetic acid extracts are extracted with a total of 750 parts by volume of chloroform, the extract solution washed with water, dried with sodium sulfate and evaporated to dryness in vacuo, thus obtaining 20 parts by weight of residue.

The above chloroform residue is dissolved in 200 parts by volume of benzene at 30–40° C., filtered off from the undissolved residue, and the filtrate either used directly for chromatography in the manner described in Examples 1 and 3, or evaporated to dryness in vacuo (residue 5.2 parts by weight) and the reserpine crystallized by warming the residue in once to twice the quantity of methanol and leaving it to stand for a long time, the reserpine being thus obtained in pure form.

*Example 7*

100 parts by weight of the dry methanol extract described in Example 6 are extracted by stirring with a mixture of 210 parts by volume of chloroform and 90 parts by volume of methanol. The residue is then extracted a second time by triturating with half the volume of the above mixture. The combined extract solutions are agitated with 270 parts by volume of water and a sufficient quantity of saturated sodium bicarbonate solution to produce a pH value of 8.5 to 9, whereupon the mixture separates in two phases. If the process is continued in the same way as in Example 2, 28 parts by weight of chloroform dry extract are obtained, which is crystallized from methanol, whereupon reserpine is obtained in a pure form.

*Example 8*

1,000 parts by weight of ground roots from *Rauwolfia serpentina* Benth. are extracted with 10,000 parts by volume of acetic acid of 15 per cent. strength in the manner described in Example 5. 60 parts by weight of "Hyflo" and then, successively in portions, 70 parts by weight of sodium nitrate and 700 parts by weight of sodium chloride are added to 8,500 parts by volume of the acetic acid extract solution while stirring well. 160 parts by weight of quicklime are cautiously slaked with 160 parts by volume of water and added to the solution in small portions. Finally the whole is stirred for a further hour and the mixture filtered with suction by means of a filtering cloth. The squeezed-out filter cake is washed with 200–300 parts by volume of saturated sodium chloride solution and 100 parts by volume of water and dried in vacuo over phosphorus pentoxide.

160 parts by weight of the dry residue are extracted with a mixture of 350 parts by volume of chloroform and 150 parts by volume of methanol while stirring, filtered with suction and the residue washed with 400 parts by volume of the same mixture. Thereupon the residue is extracted a second time with 400 parts by volume of the mixture and washed with 100 parts by volume. To each 500 parts by volume of the extract solution 300 parts by volume of water and sufficient saturated sodium bicarbonate solution to produce a pH value of 8.5 to 9 are added, the mixture agitated and the two phases separated. The combined lower phases (chloroform) are once more washed with 200 parts by volume of a solution of sodium chloride of 2–3 per cent. strength. The combined upper phases (water/methanol) are again extracted with 100 parts by volume of chloroform, whereupon the second chloroform phase is also passed through the aforementioned sodium chloride solution of 2–3 per cent. strength. The combined chloroform extracts are dried with sodium sulfate and evaporated in vacuo to dryness. The residue is further treated in the manner described in Example 2 or 6, whereupon pure reserpine is obtained.

*Example 9*

20,000 parts by weight of ground bark from the roots of *Rauwolfia inebrians* are percolated with 100,000 parts by volume of methanol. The extracting agent is evaporated and a brown-colored powder obtained which is kneaded with water several times to remove soluble products. The insoluble residue is then kneaded with dilute hydrochloric acid to remove basic portions, washed with water and dried. For preliminary purification the remaining insoluble portion is finely ground, exhaustively extracted with petroleum ether and the brown powder which is then left behind is stirred for several hours with about 3,000 parts by volume of 95% alcohol. About 80–90% of the material thus pass into solution. The dark brown solution is suction-filtered and evaporated to dryness to obtain 710 parts of a pre-purified extract.

The extract is subjected to a distribution between a mixture of 50 per cent. of methanol and 50 per cent. of water constituting the upper phase in equilibrium with chloroform as the lower phase. It has been found that a separation which is sufficient for practical purposes is achieved when 200 parts by weight of the extract are distributed in six separating funnels each holding 2,000 parts by volume of the upper phase and 2,000 parts by volume of the lower phase. The phases obtained in this way are combined to form six fractions according to the scheme described in Example 1.

Fraction 6, ascertained to be active, is further purified by chromatography over alumina. To this end, 91 parts by weight are dissolved in benzene and poured onto a column of 1,500 parts by weight of alumina. There follow elution with benzene and mixtures of benzene and acetone, evaporation of the eluates and crystallization from acetone. The base thus obtained is identical with the reserpine isolated from *Rauwolfia serpentina* Benth. The values found on analysis are the following: $C=65.00\%$; $H=6.82\%$; $N=4.63\%$.

*Example 10*

9,500 parts by weight of ground roots of *Rauwolfia vomitoria* Afz. are percolated with 70,000 parts by volume of methanol. After evaporating the extracting agent 800 parts by weight of a brown-colored powder are obtained which are thoroughly mixed with 600 parts by weight of "Hyflo" and extracted with water several times for removal of the soluble constituents. The insoluble residue remaining from this operation is moistened with 1,000 parts by volume of acetic acid of 15 per cent. strength and extracted three times with 1,500 parts by volume of 15% acetic acid each time. Each extraction operation is followed by suction-filtering and washing of the residues with 500 parts by volume of 15% acetic acid each.

The combined acetic acid extract solutions are extracted three times, i. e. once with 2,500 parts by volume and twice with 1,500 parts by volume of ethylene chloride and the combined extracts washed with potassium carbonate solution and twice with water. They are then dried with sodium sulfate and evaporated to dryness in vacuo to obtain a residue of 45 parts by weight. From the latter there is obtained a base by chromatography over alumina and crystallization from methanol. This base is identical with the reserpine obtained from *Rauwolfia serpentina*. The values found on analysis are as follows: $C=65.24$; $H=6.55$; $N=4.66$ per cent.

*Example 11*

1,000 parts by weight of ground root material from *Rauwolfia serpentina* Benth. are extracted with 7,000 parts by volume of 95% ethanol in the manner indicated in Example 1, treated with water and dilute hydrochloric acid, dried, extracted with petroleum ether and finally taken up in 400–500 parts by volume of warm 95% ethanol. The portion which is soluble in the alcohol is mixed with 5 parts by weight of saw dust, the mixture evaporated in vacuo and finally dried for about 8 hours in a high vacuo.

12 parts by weight of the dry residue are extracted with ether in a Soxhlet apparatus for 8 hours, that is to say, until the solution is colorless. The extract solution is evaporated and yields 0.5 part by weight of a residue which crystallizes from methanol and melts at 81–83° C., thus not being identical with reserpine.

The extraction residue is then extracted with chloroform in the same apparatus for 38 hours, that is to say, until the solution is colorless, the solvent being renewed twice. On evaporation of the extract solution there are obtained 3.3 parts by weight of a residue. It is chromatographed on alumina as described in Example 3. From the eluates (mixtures of benzene and acetone) there is then obtained a small quantity of reserpine.

The extraction residue is then extracted with ethyl acetate in the same manner for 38 hours, the solvent being renewed twice. On evaporation of the extract solution 1,2 parts by weight of a residue are obtained which is chromatographed in the same manner over alumina, and reserpine isolated from the eluates.

*Example 12*

1,750 parts by weight of root bark of *Rauwolfia serpentina* Benth. are percolated with 8,500 parts by volume of methanol. On evaporation of the extract solution there are obtained 264 parts by weight of a dark brown resin which is kneaded with water several times to remove the soluble constituents. The residue which remains behind is extracted five times with 350 parts by volume of 0.5N phosphoric acid each time and the combined acid extracts extracted four times with 400 parts by volume of chloroform each time. The chloroform solution is washed as usual with a potassium carbonate solution and water, dried with sodium sulfate, and evaporated to dryness in vacuo. The residue amounting to 8 parts by weight is chromatographed over 100 parts by weight of alumina and reserpine is obtained when the eluate fractions are evaporated to dryness and the residues are crystallized with acetone.

*Example 13*

1,000 parts by weight of ground roots of *Rauwolfia serpentina* Benth. are extracted for 24 hours with 4,000 parts by volume of ethylene chloride under reflux. Under reduced pressure, the extract solution is concentrated to 500 parts by volume and 100 parts by weight of "Hyflo" and 300 parts by volume of water added. The ethylene chloride is then completely removed in vacuo, the residual mixture suction-filtered and washed repeatedly with water. The insoluble residue is kneaded several times with 2N acetic acid and the combined acetic acid solutions extracted three times with chloroform. The combined chloroform extracts are washed with sodium bicarbonate solution and water, dried with sodium sulfate and evaporated to dryness in vacuo. The 6.9 parts by weight of the residue so obtained are crystallized from methanol and the base is purified by way of the hydrochloride as described in Example 2. Reserpine is thus obtained in pure form.

*Example 14*

1,000 parts by weight of ground roots of *Rauwolfia serpentina* Benth. are boiled under reflux for 20 hours with 2,000 parts by volume of an azeotropic mixture boiling at 61° C. and consisting of 57.1 per cent. by volume of ethylene chloride and 42.9 per cent. by volume of methanol. The extract solution is mixed with 1600 parts by volume of water and the quantity of saturated bicarbonate solution required to produce a pH of about 9. The phases formed are separated and washed in the manner described in Example 2. The ethylene chloride phase is then dried with sodium sulfate and evaporated to dryness in vacuo. The residue of 29.8 parts by weight is crystallized from 45 parts by volume of methanol. The crude crystals can be converted into the pure reserpine base by way of the hydrochloride as described in Example 2.

From the reserpine obtained according to the present process its salts, e. g. the nitrate, can be obtained in the following manner:

1 part by weight of reserpine is dissolved in 80–100 parts by volume of 2N acetic acid and 8–10 parts by volume of 30% nitric acid added in portions while stirring well and cooling with ice. Stirring is continued for a short time in the cold and the crystallizate separated by suction-filtering. The filter residue is washed first with water and then with plenty of acetone and dried over caustic alkali in a vacuum exsiccator. By dissolving in a large quantity of hot methanol and adding the 2 to 3-fold quantity of ether the reserpine nitrate can be recrystallized. It forms colorless needles and melts at 235° C. with decomposition.

On the other hand, the same salt can be obtained by starting directly from the base and dissolving, e. g. 1 part by weight of reserpine in 5–7 parts by volume of acid free chloroform and preparing a fine froth or reserpine by immediate evaporation under reduced pressure. When the calculated quantity of nitric acid or an excess thereof, e. g. in alcoholic solution, is added and the mixture heated for a short time, there is obtained the crystalline reserpine nitrate.

In the same manner there can also be prepared, e. g. the salts of hydrochloric acid (melting point: approx. 221° C. with decomposition), sulfuric acid (melting point: approx. 244° C. with decomposition), perchloric acid, (melting point: approx. 239° C. with decomposition), methane sulfonic acid, (melting point: beginning unsharply at 190° C.), picric acid, (melting point: approx. 186° C.), or oxalic acid, (melting point: approx. 206° C. with decomposition).

The salts of weak acids, e. g. salicylic acid, ascorbic acid, citric acid, malic acid, succinic acid, or tartaric acid are obtained, for instance, by dissolving separately equivalent quantities of the base and the acid in a weakly polar solvent, such as chloroform or acetone, combining the solutions and evaporating them to dryness under reduced pressure. The salts can be crystallized from a mixture of ether and a small proportion of ethyl acetate.

Reserpine and salts thereof obtained according to the foregoing examples can be made up into pharmaceutical preparations for oral or parenteral administration in various dosage unit forms. For example, a tablet of the following composition can be made:

|   | Mg. |
|---|---|
| 1. Reserpine | 0.5 |
| 2. Lactose | 53.0 |
| 3. Gelatine | 1.0 |
| 4. Starch | 40.0 |
| 5. Magnesium stearate | 0.3 |
| 6. Talcum | 5.2 |
|   | 100.0 |

In making the tablet, a homogeneous mixture is prepared from 1 and 2. A paste is made with 3 and a part of 4. The paste is mixed with the mixture of 1 and 2, and the remainder of 4 to form a moist homogeneous mass which is then granulated and dried. After this, 5 and 6 are added and the product tableted.

What is claimed is:

1. A crystalline product of manufacture consisting of a member selected from the group consisting of reserpine and the therapeutically active acid addition salts thereof.

2. A crystalline product of manufacture consisting of reserpine.

3. A pharmaceutical preparation for internal use including injection compounded with a crystalline product of manufacture consisting of a member of the group consisting of reserpine and the therapeutically active acid addition salts thereof, and a non-toxic pharmaceutical carrier.

4. A pharmaceutical preparation for internal use compounded with a crystalline product of manufacture consisting of a member of the group consisting of reserpine and the therapeutically active acid addition salts thereof, and a non-toxic solid pharmaceutical carrier.

5. A pharmaceutical preparation for internal use including injection in dosage unit form compounded with a crystalline product of manufacture consisting of a member of the group consisting of reserpine and the therapeutically active acid addition salts thereof, and a non-toxic pharmaceutical carrier.

6. A pharmaceutical preparation for oral use compounded with a crystalline product of manufacture consisting of a member of the group consisting of reserpine and the therapeutically active acid addition salts thereof, and a non-toxic solid pharmaceutical carrier.

7. A pharmaceutical preparation for parenteral use compounded with a crystalline product of manufacture consisting of a member of the group consisting of reserpine and the therapeutically active acid addition salts thereof, and a parenterally applicable non-toxic liquid carrier.

8. A pharmaceutical preparation for internal use including injection compounded with a crystalline product of manufacture consisting of reserpine, and a non-toxic pharmaceutical carrier.

References Cited in the file of this patent

Gupta et al.: Ind. J. Med. Research, vol. 32, pp. 183–88 (1944), as abstracted in Chem. Abstr., vol. 40, col. 4148 (1946).

Dutt et al.: Ind. J. Pharm., vol. 9, pp. 54–57 (1947), as abstracted in Chem. Abstr., vol. 42, col. 2729 (1948).

Gupta et al.: J. Am. Pharm. Assoc., Sci. Ed., vol. 36, p. 416 (1947).

Schlittler et al.: Helv. Chim. Acta., vol. 33, pp. 1470–73 of article on pp. 1463–77 (1950).

Wilkins et al.: The New England Journal of Medicine, vol. 250, No. 11, pp. 477–78 (March 18, 1954).

Van Hallie et al.: Arch. Pharm., vol. 270, pp. 313–22 (1932).

Steenhauer: Pharm. Weckblad, vol. 89, p. 162, March 13, 1954.